United States Patent
Bugle et al.

(10) Patent No.: US 7,125,072 B2
(45) Date of Patent: Oct. 24, 2006

(54) BICYCLE SEAT RAIL AND METHOD OF MAKING SAME

(75) Inventors: Clifford M. Bugle, South Park, PA (US); Robin L. Pesa, Sewickley, PA (US); Jill R. McGibbney, Sewickley, PA (US)

(73) Assignee: Dynamet Holdings, Inc., Wilmington, DE (US)

( * ) Notice: Subject to any disclaimer, the term of this patent is extended or adjusted under 35 U.S.C. 154(b) by 0 days.

(21) Appl. No.: 10/957,119

(22) Filed: Oct. 1, 2004

(65) Prior Publication Data

US 2005/0040683 A1    Feb. 24, 2005

Related U.S. Application Data

(63) Continuation-in-part of application No. 10/108,289, filed on Mar. 27, 2002.

(51) Int. Cl.
*B60N 2/38* (2006.01)

(52) U.S. Cl. ............... 297/195.1; 297/203; 297/205; 297/215.14

(58) Field of Classification Search ........... 403/359.1, 403/389, 387, 109.1; 52/740.1, 740.8, 742.7; 297/195.1, 215.14, 203, 205; 138/177, DIG. 11, 138/106; 16/436, 431
See application file for complete search history.

(56) References Cited

U.S. PATENT DOCUMENTS

| | | | |
|---|---|---|---|
| 177,337 A * | 5/1876 | Johnson ............... | 403/359.1 |
| 293,656 A | 2/1884 | Lamplugh | |
| 507,514 A | 10/1893 | Warwick | |
| 568,802 A | 10/1896 | Seaman | |
| 577,084 A | 2/1897 | Vail | |
| 952,259 A | 3/1910 | Jenks | |
| 1,100,742 A * | 6/1914 | Kane ..................... | 52/740.4 |
| 1,142,087 A | 6/1915 | Golding | |
| 1,315,661 A | 9/1919 | Goldie | |
| 1,404,198 A * | 1/1922 | Gerson ................. | 52/740.4 |
| 4,099,769 A | 7/1978 | Jacobs | |
| 4,367,896 A | 1/1983 | Nieddu | |
| 4,452,591 A * | 6/1984 | Fishbaugh et al. ..... | 464/89 |
| 4,772,245 A * | 9/1988 | Readman et al. ..... | 464/89 |
| 4,984,776 A * | 1/1991 | Smith ................... | 267/276 |
| 5,085,289 A * | 2/1992 | Chance ................. | 180/383 |
| 5,226,624 A * | 7/1993 | Kingsbery ............ | 248/219.2 |
| 5,294,173 A | 3/1994 | Yu | |
| 5,330,473 A | 7/1994 | Howland | |
| 5,356,198 A | 10/1994 | Hughes | |
| 5,558,396 A | 9/1996 | Yu | |
| 5,568,958 A * | 10/1996 | Chen ..................... | 297/215.15 |
| 5,597,202 A * | 1/1997 | Andersen ............. | 297/195.1 |

(Continued)

*Primary Examiner*—Peter M. Cuomo
*Assistant Examiner*—Erika Garrett
(74) *Attorney, Agent, or Firm*—Niels Haun; Dann, Dorfman, Herrell & Skillman, PC

(57) ABSTRACT

A seat rail for a bicycle seat and a method of fabricating same are disclosed. The seat rail comprises a rod having one or more flutes formed along the length of the rod. The seat rail provides support for a bicycle seat and provides means for securing the seat to the frame of a bicycle. The flutes in the rod reduce the effective cross-sectional area of the rod which results in a significant decrease in the weight of the seat rail, but without a significant loss of rigidity and strength. The fabrication method comprises providing an elongated rod-shaped feedstock, forming at least one flute along the length of the rod-shaped feedstock, and then bending the fluted feedstock to form the seat rail.

21 Claims, 7 Drawing Sheets

U.S. PATENT DOCUMENTS

| | | | |
|---|---|---|---|
| 5,597,902 A | 1/1997 | Bootz et al. | |
| 5,664,829 A | 9/1997 | Thomson et al. | |
| 5,709,430 A * | 1/1998 | Peters | 297/201 |
| 5,749,622 A * | 5/1998 | Tseng | 297/195.1 |
| 5,765,912 A * | 6/1998 | Bontrager | 297/214 |
| 5,823,618 A | 10/1998 | Fox et al. | |
| 6,006,477 A * | 12/1999 | Ko | 403/109.1 |
| 6,019,422 A * | 2/2000 | Taormino et al. | 297/195.1 |
| 6,039,394 A | 3/2000 | Chen | |
| 6,149,526 A * | 11/2000 | Boersma et al. | 464/89 |
| 6,183,230 B1 * | 2/2001 | Beardmore et al. | 418/171 |
| 6,213,553 B1 | 4/2001 | Fitz | |
| 6,217,453 B1 * | 4/2001 | Thompson | 464/89 |
| 6,322,139 B1 * | 11/2001 | Chuang | 297/195.1 |
| 6,322,283 B1 * | 11/2001 | Chen | 403/345 |
| 6,443,524 B1 | 9/2002 | Yu | |
| 6,561,578 B1 * | 5/2003 | Mel | 297/195.1 |
| 2003/0184135 A1 | 10/2003 | Bugle et al. | |

* cited by examiner

BICYCLE SEAT RAIL AND METHOD OF MAKING SAME

RELATED APPLICATIONS

This is a continuation-in-part application of U.S. application Ser. No. 10/108,289, filed Mar. 27, 2002, the entire contents of which application are incorporated herein by reference.

FIELD OF THE INVENTION

The present invention relates generally to a bicycle seat and in particular to a light-weight fluted bicycle seat rail.

BACKGROUND OF THE INVENTION

In the evolution of bicycle design a constant theme is the reduction of weight. Bicycle racers continually seek reductions in bicycle weight and recreational cyclists also desire lightweight bicycles for ease of handling and convenience. Consequently, decreasing the weight of a bicycle remains high among the important goals in bicycle design.

While reduction in weight of the frame of the bicycle continues to be a major focus, weight reduction in other components of the bicycle can contribute to the goal of decreasing overall weight. For example, one component which has received little attention is the bicycle seat rail, which is used to support the seat and attach it to the frame. Current strategies used for weight reduction in components such as the frame are not well suited for reducing the weight of the seat rail due to the structural and functional differences between the seat rail and other bicycle components. The carbon or fiberglass reinforced resin tubes typically used for the frame or seat post are not well suited for use in a seat rail. The bicycle seat is usually clamped to hold it in place. Therefore, the seat rail is subject to point loading and potential gouging which might damage a non-metallic material and adversely affect the structural integrity of a seat rail formed of such a material. Consequently, a need exists for a new approach to weight reduction for the seat rail while maintaining sufficient strength and compatibility with current seat clamping systems.

SUMMARY OF THE INVENTION

In response to these needs, the present invention provides a fluted bicycle seat rail. The seat rail comprises a rod having one or more flutes extending along at least a portion of the length of the rod. The seat rail provides support for a seat shell on which the rider sits and provides means for securing the shell in position relative to the frame of a bicycle. For example, the fluted rod of the seat rail can be formed as a curved member providing three contact points, an arcuate middle portion and two ends, to provide an armature for supporting the shell. The inclusion of flutes in the rod affords a decrease in the weight of the rod compared to a rod having a similar overall diameter but having no flutes. The present invention also provides a seat comprising the fluted seat rail. The seat comprises a shell and an armature in communication with the shell. The armature supports the shell and provides means to secure the shell relative to the frame of the bicycle. The armature comprises a fluted rod for supporting the shell.

In one particularly desirable configuration, a seat rail for supporting a bicycle seat is provided comprising a rod that has a flute formed therein with the flute disposed at an orientation along the rod so that deflection of the rod under loading is minimized. Specifically, the rod may have a maximum cross-sectional dimension disposed along a selected direction and the flute may be oriented so that the selected direction is oriented in the loading direction so that deflection of the rod under loading is minimized.

The present invention further provides a method for forming a fluted bicycle seat rail. The method comprises providing a rod-shaped feedstock, forming at least one flute along the length of the rod-shaped feedstock, and bending the fluted feedstock to form a seat rail.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
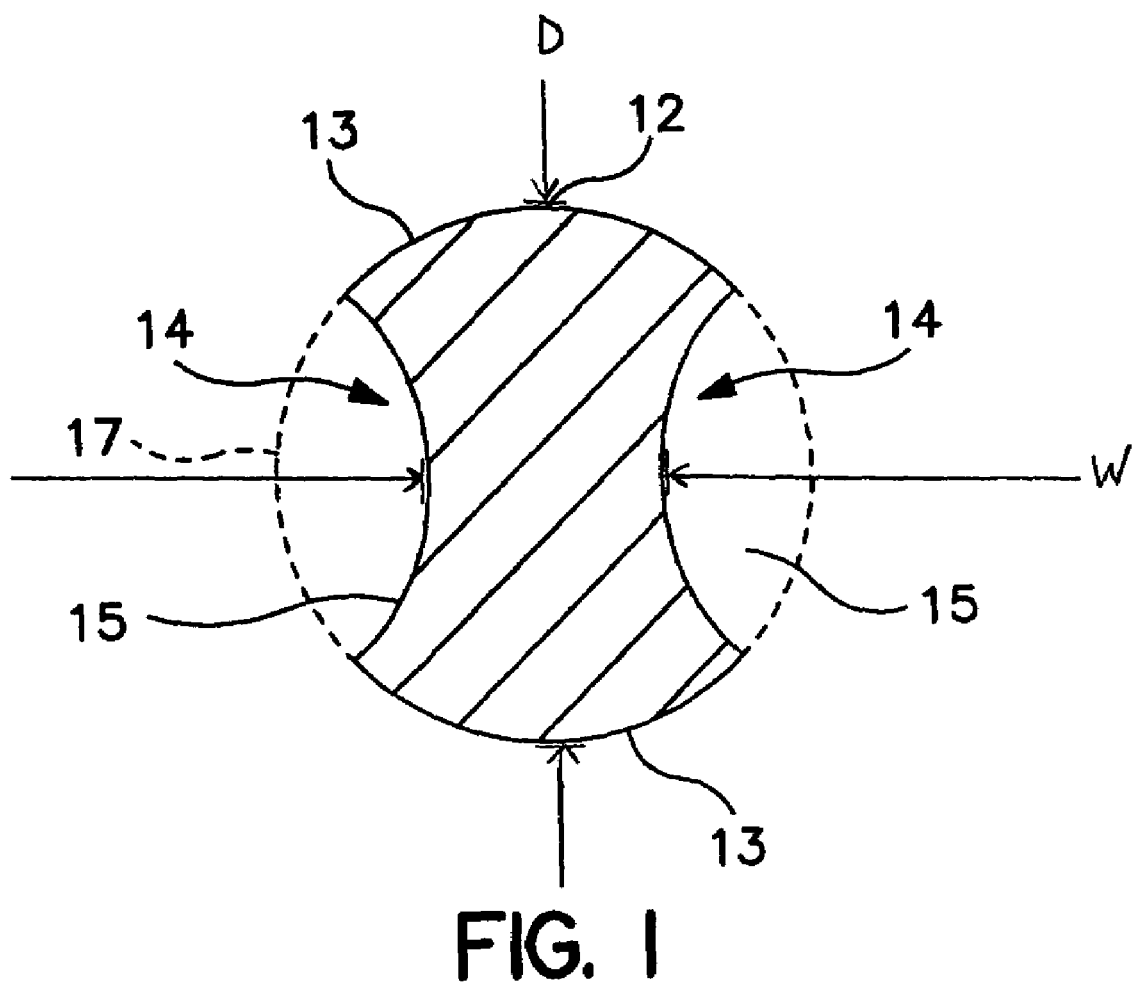
FIG. 1 is a cross-sectional view of a preferred configuration for a seat rail of the present invention.

Referring now to the drawings, wherein like reference numerals refer to the same or similar components or features, and in particular to FIGS. 1–4, 10A, and 10B, a fluted rod 12 for use in a bicycle seat rail in accordance with the present invention is shown. The elongated rod 12 has one or more flutes 14 formed along at least a portion of the length of the rod 12. The fluted shape preserves the structural integrity of the rod 12, while maximizing weight reduction and maintaining dimensional compatibility with mating hardware currently in use. For example, the flutes 14 may displace enough metal to reduce the weight of the rod 12 by at least 17%, while maintaining the maximum cross-sectional dimension of 0.276 inches, which is the current industry standard. A seat rail having such a maximum cross-section would be readily received by the industry standard seat fixture that accepts a current nominal dimension of 0.276 inches.

Figure 10A:
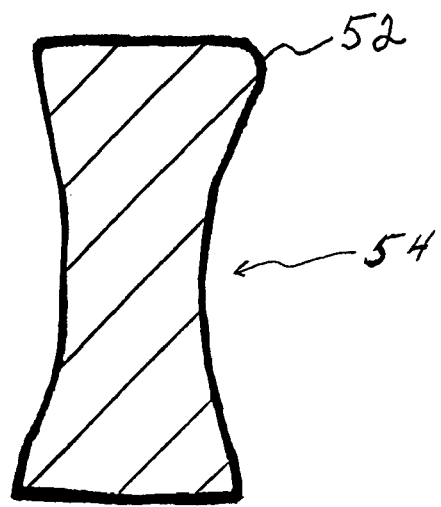
FIGS. 10A and 10B are cross-sectional views of additional configurations for a seat rail of the present invention.
Figure 10B:
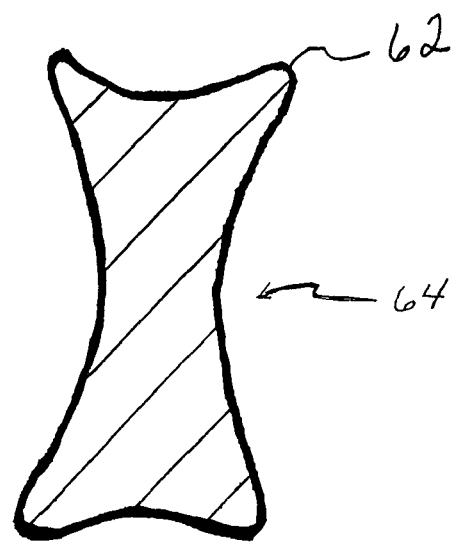

The rod 12 may have a generally circular cross-sectional shape 17 prior to the formation of the flutes 14 which is suited for clamping in standard seat post clamps. Alternatively, cross-sectional shapes other than circular, such as square or polygonal shapes, for instance, may be used. For example, the cross-sectional shape of the rod 52, 62 may be generally rectangular, as illustrated in FIGS. 10A and 10B.

The flutes 14 are channels or grooves that extend along the length of the rod 12 and have flute surfaces 15 that are generally concave in shape. The flute surfaces 15 may take the form of an arcuate surface or, alternatively, may have straight wall sections to form other shapes such as a V-groove or U-groove, for example. It may also be desirable to vary the shape and or depth of the flutes along a rod.

The presence of the flutes 14 in the rod 12 decreases the weight of the rod 12 as compared to a similarly dimensioned rod without flutes. The flutes 14 are preferably spaced at equal angular intervals about the circumference of the rod 12. In the embodiment shown in FIG. 2 each flute 24 is spaced about 120 degrees apart, and in the embodiment shown in FIGS. 3 and 10B, the flutes 34, 64 are spaced approximately 90 degrees apart. Alternatively, the flutes 14, 24, 34, 54, 64 may be placed at selected angular spacings that are not equal. In a preferred configuration the rod 12, 52 includes at least two flutes 14, 54 but no more than four flutes, FIGS. 1–4. For the configuration with exactly two flutes 14, 54, the flutes 14, 54 may be disposed on opposing sides of the rod as show in FIGS. 1 and 10A.

Figure 5:
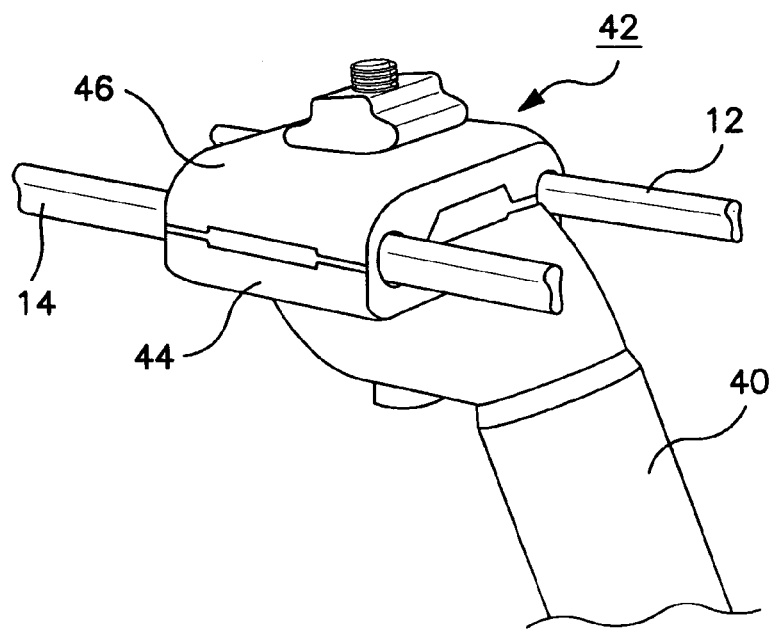
FIG. 5 is a perspective, fragmentary view of a seat rail of the present invention attached to a seat post by a clamp.

The angular spacing of the flutes 14 is selected so that the spacing of the non-fluted surfaces 13 of the rod 12 are positioned to be gripped with the clamp used to attach the seat rail 10 to the bicycle frame. For example, as shown in FIG. 5, the seat rail 10 is attached to a seat post 40 using a clamp 42. The clamp 42 includes an upper clamping element 46 and a lower clamping element 44 each having grooves formed on the gripping surface thereof. The non-fluted surfaces 13 of the rod 12 are oriented so that the non-fluted surfaces 13 contact the grooves of the upper clamping element 46 and lower clamping element 44. This orientation of the flutes 14 and non-fluted surfaces 13 is also selected to maximize the load-bearing capacity of the rod 12.

The fluted rod of the present invention allows for greater deflection of the rod under similar loading conditions than that of an un-fluted rod having similar dimensions. The increased deflection would desirably not exceed 16.2% of the presently used round rod. In this regard, the orientation of the fluted rod 12 is important so that deflection is minimized. Hence, the maximum cross-sectional dimension of the rod should be oriented in the loading direction. For example, as illustrated in FIG. 5, the load-bearing capacity of the rod 12 is maximized when the rod is oriented in the clamp 42 with the flutes 14 not facing the gripping surfaces of the clamp 42.

By way of example, for one particular design of seat rail in accordance with the present invention, two flutes 12 are provided which may be formed by rolling depressions into round titanium bar stock, thereby displacing the volume of metal used in the seat rail, FIG. 1. The flutes 12 are disposed in opposition to one another along the length of the rod 12. The maximum cross-sectional dimension, "D", is 0.276 inches diameter. The two flutes 14 each have a depth of 0.08–0.09 inches, which provides a web, "W", of a minimum dimension of 0.096–0.116 inches measured in cross-section at 90° from the maximum dimension, "D". The radius at the base of the flute 12 is 0.12 inches. The cross sectional area of the rod 12 having the above-listed dimensions is 0.0495–0.0371 square inches, as compared to the presently used solid, round rod which has a diameter of 0.276 inches and a cross sectional area of 0.0598 square inches. The reduction in area from the rod used in the industry (and hence the reduction in weight for rods of the same length) is desirably between 17% and 38%. That is, the rod 12 would have a nominal, maximum dimension, D, of 0.276 inches, to provide a seat rail having a weight of approximately 52.20–57.57 g as compared to the current industry standard rail weight of approximately 86.57 g. Specifically, a rod 12 with two flutes having a depth of 0.08 inches, would create a web dimension of 0.116 inches, and leave a cross sectional area of 0.0495 square inches, effecting a 17% weight reduction of the seat rail. Conversely, a rail with two flutes having a depth of 0.09 inches, would create a web dimension of 0.096 inches, and leave a cross sectional area of 0.0371 square inches, effecting a 38% weight reduction of the seat rail.

Figure 6:
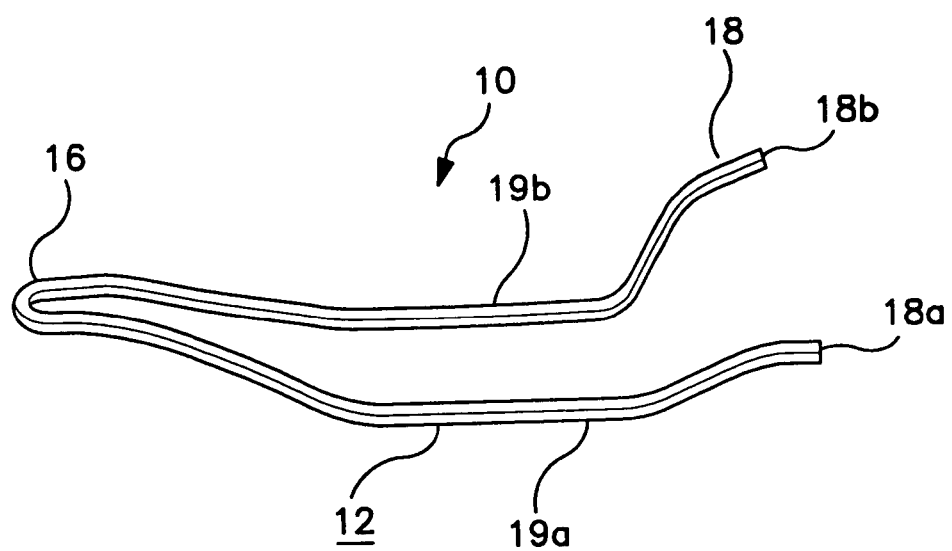
FIG. 6 is a perspective view of a seat rail of the present invention.
Figure 8:
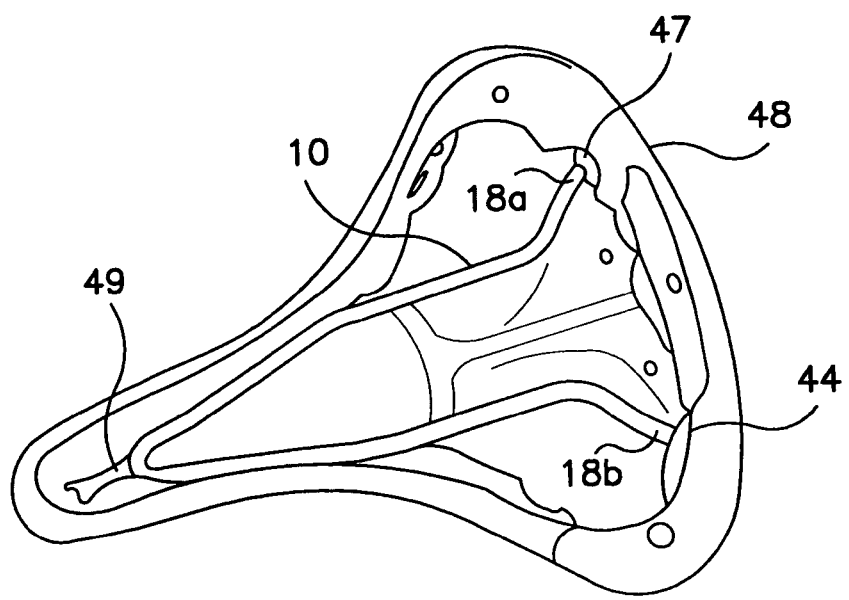
FIG. 8 is a bottom view of a bicycle seat of the present invention.
Figure 7:
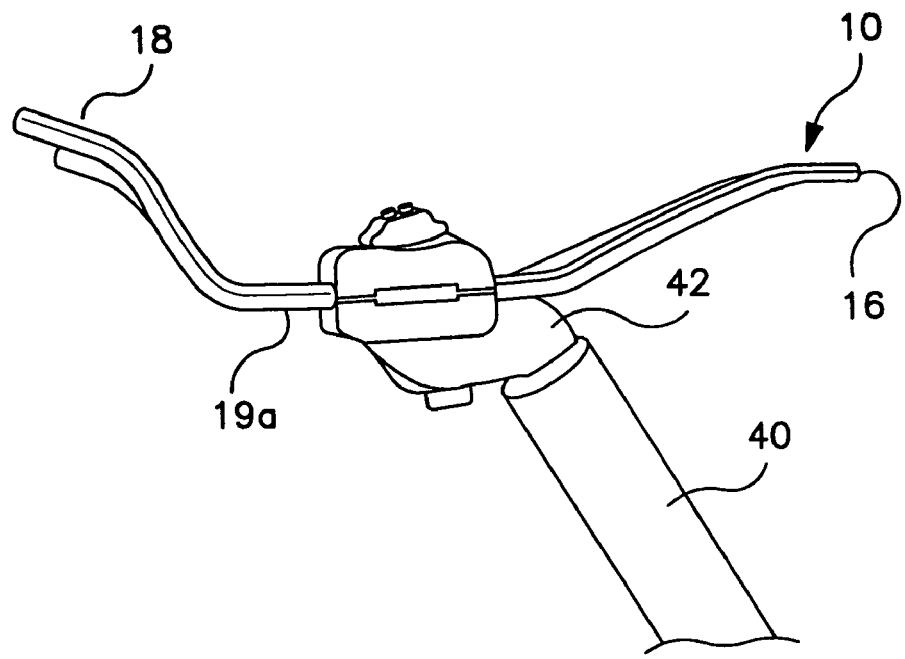
FIG. 7 is a side elevational view of the seat rail of FIG. 6 when attached to a seat post by a clamp.
Figure 9:
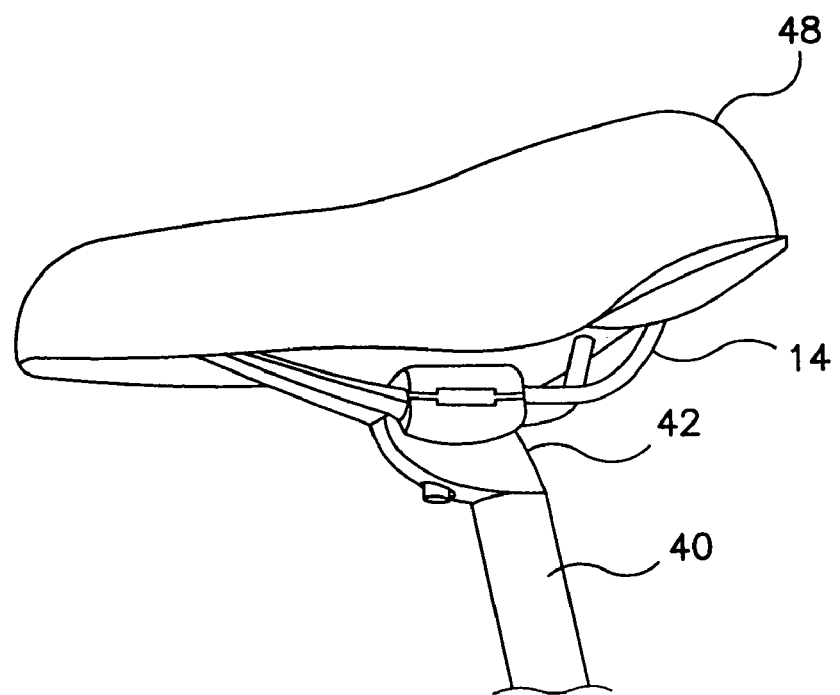
FIG. 9 is a side elevational view of the bicycle seat of FIG. 8 when attached to a seat post.

FIGS. 6–9 show perspective and plan views of a seat rail 10 for a bicycle seat. The seat rail 10 has an overall shape that is formed for supporting a seat shell 48 to provide an armature for the seat shell 48. In particular, the seat rail 10 is preferably shaped to provide contact with the seat shell 48 at multiple points. For example, as best seen in FIGS. 6–8, the seat rail 10 includes a curved front portion 16, which is preferably located proximate the midpoint of rod 12 between the ends 18a, 18b. Between the curved front portion 16 and each of the ends 18a, 18b are two linear portions 19a, 19b disposed in parallel, spaced-apart relation. The seat rail 10 is preferably configured so that the curved front portion 16 and ends 18a, 18b are offset from the linear portions 19a, 19b to permit contact between the seat shell 48 and the curved front portion 16 and ends 18a, 18b. As shown in FIG. 8, each end 18a, 18b of the seat rail 10 engages with recesses in the rear of the seat shell 48, and in particular may be received by mounting holes 47 provided in the seat shell 48. A third point of contact between the seat rail 10 and the seat shell 48 is made between the front of the seat shell 48 and the curved front portion 16. The curved front portion 16 engages with a cavity 49 formed in the front of the seat shell 48. The linear portions 19a, 19b are spaced away from the seat shell 48 to provide clamping portions whereby the seat shell 48 can be clamped to the seat post 40.

The rod 12 is formed from a lightweight material having sufficient strength and rigidity to support the seat shell 48. Preferred materials are high strength, lightweight metals and metal alloys, including, but not limited to titanium, titanium alloys, aluminum, and aluminum alloys. A particularly preferred material is a titanium based alloy containing about 6 percent by weight aluminum and 4 percent by weight vanadium (Ti-6Al-4V). In addition to the strength and rigidity requirements, the material of the rod 12 is selected to permit easy processing of the rod to form the flutes 14 and the overall shape of the seat rail 10 by methods such as those of the present invention.

A method for forming a fluted bicycle seat rail in accordance with the present invention includes the steps of providing a rod-shaped feedstock, forming at least one flute along the length of the rod-shaped feedstock, and bending the fluted feedstock to form the seat rail. Formation of the flute in the feedstock is accomplished by various processes, such as roll processing, die drawing, swaging, forging, machining, powder metallurgy, extrusion, or a combination thereof. Roll processing is a preferred technique for forming the flutes in a material such as the Ti-6Al-4V alloy.

Roll processing to form the flutes includes the step of selecting an elongated feedstock having a cross-sectional dimension selected to yield a desired cross-sectional dimension after processing the feedstock to form the flutes therein. The characteristic dimension in the case of a circular rod, for example, would be the cross-sectional diameter. Roll processing also includes the step of providing a rolling mill fitted with an even number of rolls arranged in opposing pairs. Each roll has a roll surface for contacting the surface of the feedstock, with the shape of the roll surface selected to impart a complementary shape in the contacted surface of the feedstock. For forming a flute, the roll surface of at least one roll has a convex shape that is selected to provide the desired flute surface geometry. As the feedstock is compressed by such a roll, the feedstock is indented, thereby forming a flute along the length of the feedstock.

Figure 3:
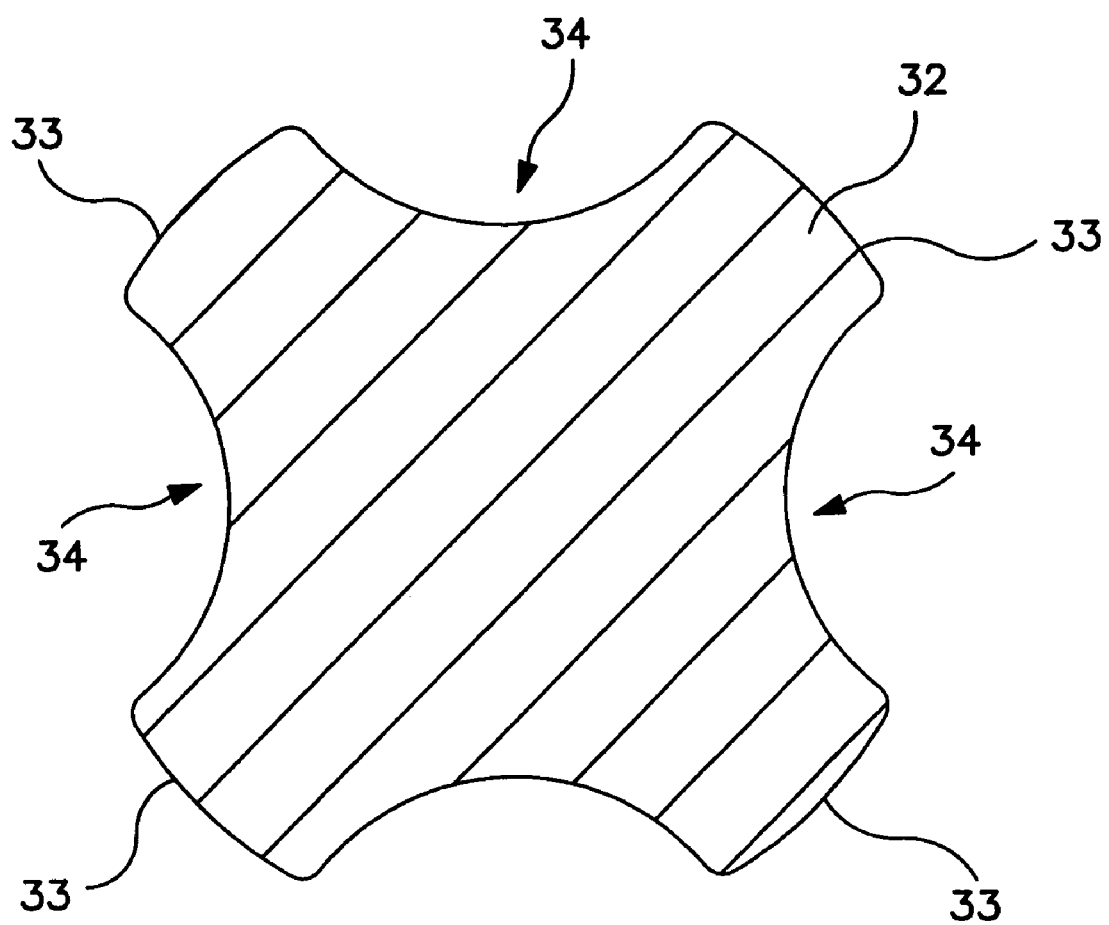
FIG. 3 is a cross-sectional view of a further configuration for a seat rail of the present invention.
Figure 4:
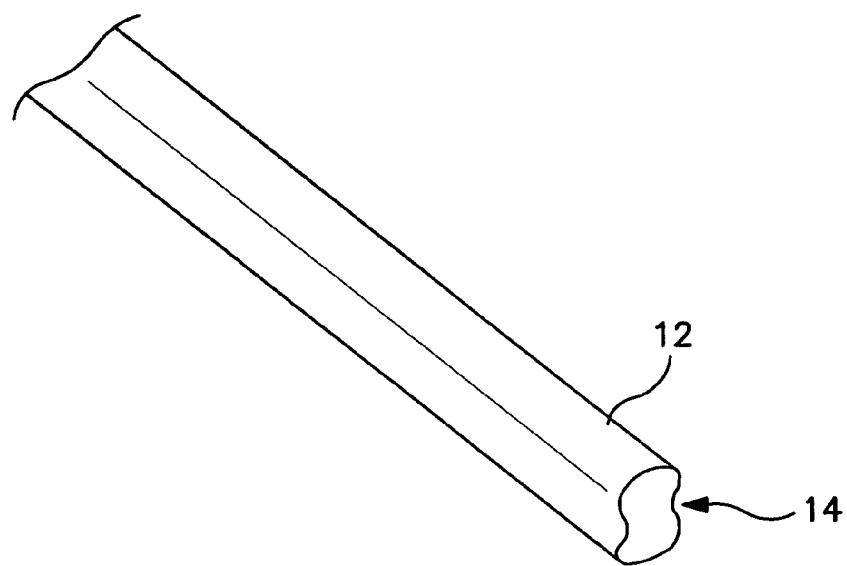
FIG. 4 is a perspective view of an end portion of a seat rail of the present invention.

By way of example, to yield the shape depicted in FIG. 1, a single pair of opposing rolls may be provided in a rolling mill, with each roll having a convex roll surface for indenting the feedstock. As the feedstock is processed through a rolling mill so configured, two flutes 14 are formed on opposing sides of the feedstock to yield the fluted rod 12 depicted in FIG. 1. In addition, such a configured rolling mill may be used to produce a fluted rod 32 having two pairs of opposing flutes, i.e., having a total of four flutes, as depicted in FIG. 3. In such a case, the feedstock may first be passed through the rolling mill to yield a fluted rod 12 having two flutes 14. Subsequently, the fluted rod 12 may be passed through the rolling mill a second time, with the fluted rod 12 inserted so that the non-fluted surfaces 13 of the fluted rod 12 contact the rolls so that two additional flutes 34 are formed in the fluted rod 12 to yield the fluted rod 32 having four flutes. Alternatively, a fluted rod having four flutes may be formed in a single passed through a rolling mill having two pairs of rolls configured to form four flutes along the length of the feedstock.

Figure 2:
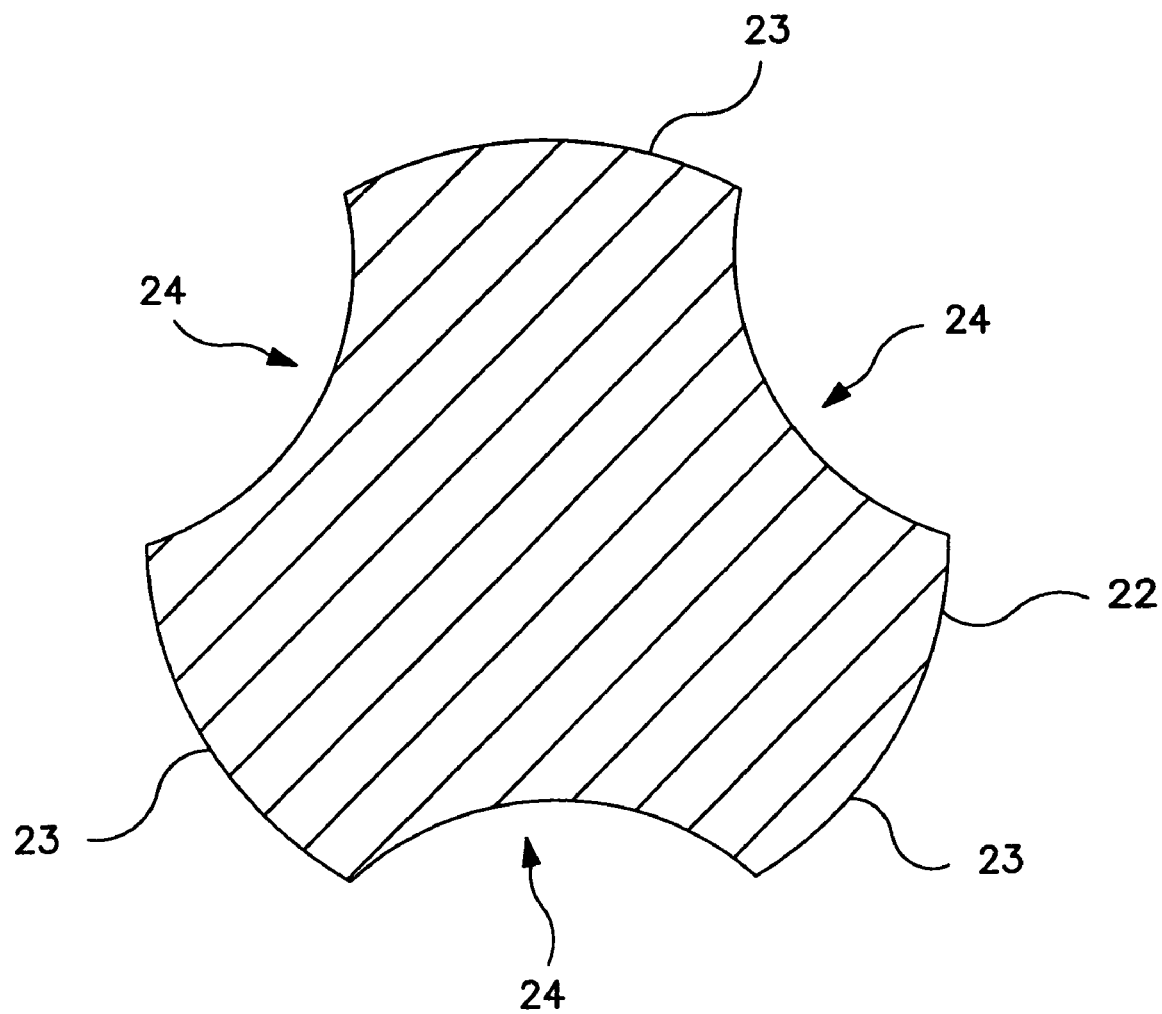
FIG. 2 is a cross-sectional view of an alternate configuration for a seat rail of the present invention.

In addition, the rolling mill can be configured so that one or more non-opposing flutes can be formed in a feedstock. An example of a fluted rod with non-opposing flutes is depicted in FIG. 2. To produce a fluted rod with non-opposing flutes, the rolling mill may be configured with a pair of opposing rolls, where one of the rolls includes a convex surface for forming a flute in the feedstock and the other roll includes a roll surface shaped to provide a non-fluted surface in the feedstock. For example, with reference to the fluted rod 22 shown in FIG. 2, a first roll may have a convex surface for forming the flute 24 and an opposing second roll may have a concave surface for forming or maintaining the opposing non-fluted surface 23. The rolling mill may be configured with three such pairs of rolls, each pair containing one roll with a concave surface and a second roll with a convex surface so that three flutes 24 are formed in the feedstock upon a single pass through the rolling mill. Alternatively, the rolling mill may be configured with a single pair of rolls for forming a single flute 24, and the feedstock may be passed through the rolling mill multiple times at different orientations for forming additional flutes 24.

The roll processing is preferably performed in such a manner so that the material displaced by the compressing operation results in reduction of the cross-sectional area and elongation of the feedstock. The cross-sectional area may be compressed, for example, to yield an industry standard diameter, such as 0.276" diameter. Such a reduced cross-sectional area will be less than that of the initial cross-sectional area of the feedstock. Hence after roll processing, a given length of the fluted rod will necessarily have a lower weight relative to an equivalent length of the feedstock from which the fluted rod was formed.

Once the feedstock has been processed to create the fluted rod, the rod is cut to a desired length suitable for forming the seat rail. Alternatively, the feedstock may be cut to the desired length prior to the fluting step. To form the seat rail from the fluted rod, the fluted rod is bent to give the fluted rod the desired overall shape as an armature for supporting the seat shell. As an alternative to the bending process, the fluting process, or both, the seat rail may be formed by machining, casting processes, powder metallurgy, or extrusions, to provide the fluted seat rail armature.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A seat rail for supporting a bicycle seat, comprising a solid rod having at least one flute formed therein, rod having two ends and an arcuate middle portion disposed between the two ends, the flute disposed at an orientation along the rod so that deflection of the rod under loading in a direction substantially perpendicular to a plane containing the arcuate middle portion is minimized.

2. A seat rail for supporting a bicycle seat according to claim 1, wherein the rod has a maximum cross-sectional dimension disposed along a selected direction and wherein the flute is oriented so that the selected direction is oriented in the loading direction so that deflection of the rod under loading is minimized.

3. A seat rail for supporting a bicycle seat according to claim 1, wherein the rod comprises at least two and no more than four flutes.

4. A seat rail for supporting a bicycle seat according to claim 3, wherein the rod comprises only two flutes.

5. A seat rail for supporting a bicycle seat according to claim 4, wherein the flutes are disposed on substantially diametrically opposing sides of the rod.

6. A seat rail for supporting a bicycle seat according to claim 1, wherein the rod comprises at least two flutes, each of the two flutes having an arcuate shape with a different radius of curvature.

7. A seat rail for supporting a bicycle seat according to claim 1, wherein the surfaces of the flute have a generally arcuate shape.

8. A seat rail for supporting a bicycle seat according to claim 1, wherein the rod comprises a maximal cross-sectional dimension, and wherein the at least one flute is dimensioned to provide at least a 17% decrease in weight of the rod as compared to a rod having a circular cross section with diameter equal to that of the maximal cross-sectional dimension.

9. A seat rail for supporting a bicycle seat according to claim 1, wherein the rod comprises a maximal cross-sectional dimension, and wherein the at least one flute is dimensioned to provide between about a 17% and 38% decrease in cross-section area of the rod as compared to a rod having a circular cross section with diameter equal to that of the maximal cross-sectional dimension.

10. A seat rail for supporting a bicycle seat according to claim 1, wherein the rod comprises a maximal cross-sectional dimension, and wherein the at least one flute is dimensioned to have a depth of about 29% of the maximal cross-sectional dimension.

11. A seat rail for supporting a bicycle seat according to claim 1, wherein the rod comprises a maximal cross-sectional dimension, and wherein the rod comprises a web having a dimension, as measured in cross-section at 90 degrees to the direction of the maximal cross-sectional dimension, of about 34% of the maximal cross-sectional dimension.

12. A seat rail for supporting a bicycle seat according to claim 1, wherein the at least one flute extends along a portion of the rod less than the entire length of the rod.

13. A seat rail for supporting a bicycle seat according to claim 1, wherein the at least one flute extends along the entire length of the rod.

14. A seat rail for supporting a bicycle seat, comprising a generally circular, single solid rod having only two flutes formed therein disposed on substantially diametrically opposing sides of the rod, the rod comprising two ends and a curved front portion configured to support the seat at each of the two ends and the curved front portion.

15. A seat rail for supporting a bicycle seat according to claim 14, wherein the surfaces of the flute have a generally arcuate shape.

16. A seat rail for supporting a bicycle seat according to claim 14, wherein the rod comprises a maximal cross-sectional dimension, and wherein the flutes are dimensioned to provide at least a 17% decrease in weight of the rod as compared to a rod having a circular cross section with diameter equal to that of the maximal cross-sectional dimension.

17. A seat rail for supporting a bicycle seat according to claim 14, wherein the rod comprises a maximal cross-sectional dimension, and wherein the flutes are dimensioned to provide between about a 17% and 38% decrease in cross-section area of the rod as compared to a rod having a circular cross section with diameter equal to that of the maximal cross-sectional dimension.

18. A seat rail for supporting a bicycle seat according to claim 14, wherein the rod comprises a maximal cross-sectional dimension, and wherein the flutes are dimensioned to have a depth of about 29% of the maximal cross-sectional dimension.

19. A seat rail for supporting a bicycle seat according to claim 14, wherein the rod comprises a maximal cross-sectional dimension, and wherein the rod comprises a web having a dimension, as measured in cross-section at 90 degrees to the direction of the maximal cross-sectional dimension, of about 34% of the maximal cross-sectional dimension.

20. A seat rail for supporting a bicycle seat according to claim 14, wherein the flutes extend along a portion of the rod less than the entire length of the rod.

21. A seat rail for supporting a bicycle seat according to claim 14, wherein the flutes extend along the entire length of the rod.

* * * * *